(12) United States Patent
Chae et al.

(10) Patent No.: US 10,517,062 B2
(45) Date of Patent: Dec. 24, 2019

(54) METHOD FOR MEASURING LOCATION OF USER EQUIPMENT IN WIRELESS COMMUNICATION SYSTEM, AND APPARATUS FOR PERFORMING SAME

(71) Applicant: LG ELECTRONICS INC., Seoul (KR)

(72) Inventors: Hyukjin Chae, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 11 days.

(21) Appl. No.: 15/751,562

(22) PCT Filed: Aug. 8, 2016

(86) PCT No.: PCT/KR2016/008676
§ 371 (c)(1),
(2) Date: Feb. 9, 2018

(87) PCT Pub. No.: WO2017/026758
PCT Pub. Date: Feb. 16, 2017

(65) Prior Publication Data
US 2018/0234938 A1 Aug. 16, 2018

Related U.S. Application Data

(60) Provisional application No. 62/204,429, filed on Aug. 12, 2015.

(51) Int. Cl.
*H04W 64/00* (2009.01)
*H04W 4/33* (2018.01)
(Continued)

(52) U.S. Cl.
CPC ............ *H04W 64/003* (2013.01); *G01C 5/06* (2013.01); *G01C 21/206* (2013.01);
(Continued)

(58) Field of Classification Search
CPC ................................ H04W 64/00; H04W 4/02
See application file for complete search history.

(56) References Cited

U.S. PATENT DOCUMENTS

| 10,094,910 B2 * | 10/2018 | Hamilton | G01S 5/14 |
| 2015/0094089 A1 * | 4/2015 | Moeglein | H04W 4/029 |
| | | | 455/456.1 |
| 2015/0141050 A1 * | 5/2015 | Haverinen | H04W 4/04 |
| | | | 455/456.1 |
| 2015/0189467 A1 * | 7/2015 | Alsehly | G01S 5/0236 |
| | | | 455/456.1 |

(Continued)

FOREIGN PATENT DOCUMENTS

| KR | 10-0990670 B1 | 10/2010 |
| KR | 10-2013-0025484 A | 3/2013 |

(Continued)

*Primary Examiner* — Charles N Appiah
*Assistant Examiner* — Frank E Donado
(74) *Attorney, Agent, or Firm* — Birch, Stewart, Kolasch & Birch, LLP

(57) ABSTRACT

According to an embodiment of the present invention, a method for measuring a location of a user equipment in a wireless communication system may comprises the steps of: measuring a magnetic field strength at a plurality of points on a trajectory along which the user equipment moves; transmitting, to a network, information including information on the measured magnetic field strength and displacement information indicating a relative location change among the plurality of points; and receiving information associated with the location of the user equipment from the network, wherein the location of the user equipment may be obtained by extracting a location where a magnetic field pattern corresponding to the feedback information appears, from magnetic field data of a three-dimensional space stored in the network.

8 Claims, 14 Drawing Sheets

(51) Int. Cl.
  *G01C 5/06*    (2006.01)
  *G01S 5/00*    (2006.01)
  *G01S 5/02*    (2010.01)
  *G01S 5/16*    (2006.01)
  *H04W 4/02*    (2018.01)
  *G01C 21/20*   (2006.01)
  *G01S 5/10*    (2006.01)

(52) U.S. Cl.
  CPC .......... *G01S 5/0036* (2013.01); *G01S 5/0252* (2013.01); *G01S 5/0263* (2013.01); *G01S 5/10* (2013.01); *G01S 5/16* (2013.01); *H04W 4/026* (2013.01); *H04W 4/33* (2018.02); *H04W 64/00* (2013.01)

(56) References Cited

U.S. PATENT DOCUMENTS

| | | | | |
|---|---|---|---|---|
| 2015/0212191 A1* | 7/2015 | Zhang | ................... | G01S 5/0236 342/450 |
| 2015/0249907 A1* | 9/2015 | Gupta | ................... | H04W 4/043 455/456.1 |
| 2015/0304941 A1* | 10/2015 | Syrjarinne | ................ | G01S 1/04 455/41.2 |

FOREIGN PATENT DOCUMENTS

| KR | 10-2014-0013308 A | 2/2014 |
|---|---|---|
| KR | 10-1428374 B1 | 8/2014 |
| KR | 10-1527212 B1 | 6/2015 |

\* cited by examiner (a) CONTROL-PLANE PROTOCOL STACK (b) USER-PLANE PROTOCOL STACK (a) in coverage    (b) out-of-coverage    (c) partial coverage

METHOD FOR MEASURING LOCATION OF USER EQUIPMENT IN WIRELESS COMMUNICATION SYSTEM, AND APPARATUS FOR PERFORMING SAME

CROSS REFERENCE TO RELATED APPLICATIONS

This application is the National Phase of PCT International Application No. PCT/KR2016/008676, filed on Aug. 8, 2016, which claims priority under 35 U.S.C. 119(e) to U.S. Provisional Application No. 62/204,429, filed on Aug. 12, 2015, all of which are hereby expressly incorporated by reference into the present application.

TECHNICAL FIELD

The present invention relates to a wireless communication system, and more particularly, to a method of measuring a location of a user equipment in indoor environment and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

A technical task of the present invention is to provide a method of more precisely and efficiently measuring a location of a user equipment in indoor environment and an apparatus therefor.

Technical Solution

To achieve these and other advantages and in accordance with the purpose of the present invention, as embodied and broadly described, according to one embodiment, a method of measuring a location of a user equipment (UE) in a wireless communication system, includes measuring a magnetic field strength at a plurality of points on a trajectory with which the UE moves along, transmitting feedback information including displacement information indicating a relative location change among a plurality of the points and information on the measured magnetic field strength to a network, and receiving information on the location of the UE from the network. In this case, the location of the UE may be obtained by extracting a location where a magnetic field pattern corresponding to the feedback information appears, from magnetic field data of a three-dimensional (3D) space stored in the network.

To further achieve these and other advantages and in accordance with the purpose of the present invention, according to a different embodiment, a user equipment (UE) in a wireless communication system includes a processor to measure a magnetic field strength at a plurality of points on a trajectory with which the UE moves along, a transmitter to transmit feedback information including displacement information indicating a relative location change among a plurality of the points and information on the measured magnetic field strength to a network, and a transmitter to receive information on the location of the UE from the network. In this case, the location of the UE may be obtained by extracting a location where a magnetic field pattern corresponding to the feedback information appears, from magnetic field data of a three-dimensional (3D) space stored in the network.

Preferably, if the UE autonomously specifies an altitude at which the UE is located, the UE can transmit the feedback information in a manner of excluding displacement of horizontal direction from the displacement information.

And, if the displacement of the horizontal direction is excluded, the UE can increase resolution of the magnetic field strength to be reported via the feedback information in consideration of a size of the reduced displacement information.

And, if the measured magnetic field strength has a threshold characteristic that appears at a certain altitude only or the UE is equipped with a barometer sensor, the UE can autonomously specify an altitude at which the UE is located.

And, the UE can receive information on the threshold characteristic that appears at the certain altitude only or information for converting an atmosphere value sensed by the barometer sensor into an altitude value from the network.

And, the displacement information indicates a relative location of the remaining points based on a point among a plurality of the points and the information on the magnetic field strength included in the feedback information can indicate an amount of change of magnetic field strength measured at the remaining points based on the point.

And, the feedback information can further include at least one RF signal measurement value selected from the group consisting of received signal strength indicator (RSSI), reference signal received power (RSRP), and reference signal time difference (RSTD) of an radio frequency (RF) signal received by the UE.

And, the 3D space of the magnetic field data to be compared with the magnetic field pattern can be selected based on a measurement value of the RF signal.

And, the feedback information can be transmitted via an location position protocol (LPP).

And, the feedback information can further include information on an orientation where the UE measures magnetic field strength at each of a plurality of the points.

Advantageous Effects

According to one embodiment of the present invention, since a location of a user equipment is measured based on a strength of a magnetic field robust to a person or an object near the user equipment (relatively less affected by the person or the object near the user equipment) in indoor environment, it is able to more precisely and efficiently measure the location of the user equipment even in indoor where an obstacle of an RF signal occurs.

Effects obtainable from the present invention are non-limited by the above mentioned effect. And, other unmentioned effects can be clearly understood from the following description by those having ordinary skill in the technical field to which the present invention pertains.

MODE FOR INVENTION

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications. In the present disclosure, a base station (eNB) may be used as a broad meaning including a remote radio head (RRH), an eNB, a transmission point (TP), a reception point (RP), a relay, etc.

Figure 1:
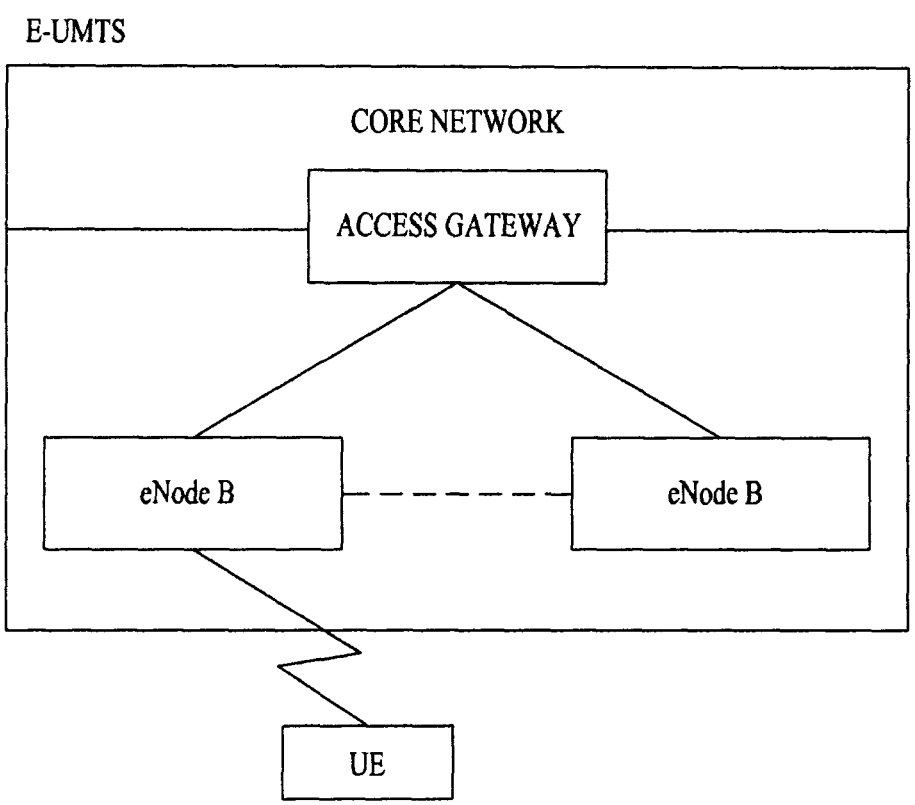
FIG. 1 is a diagram schematically illustrating a network structure of an E-UMTS as an exemplary radio communication system.
Figure 2:
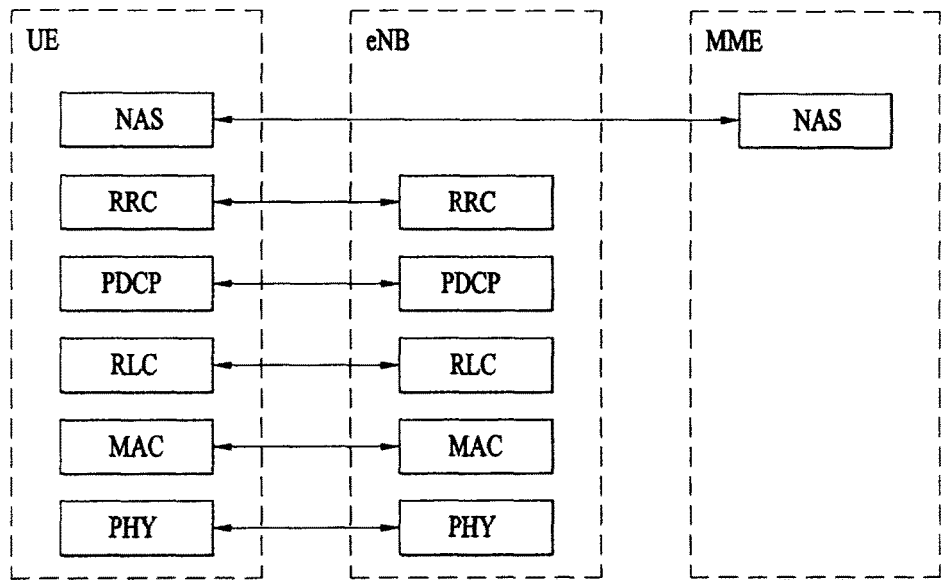
FIG. 2 is a diagram illustrating structures of a control plane and a user plane of a radio interface protocol between a UE and an E-UTRAN based on the 3GPP radio access network specification.
Figure 2:
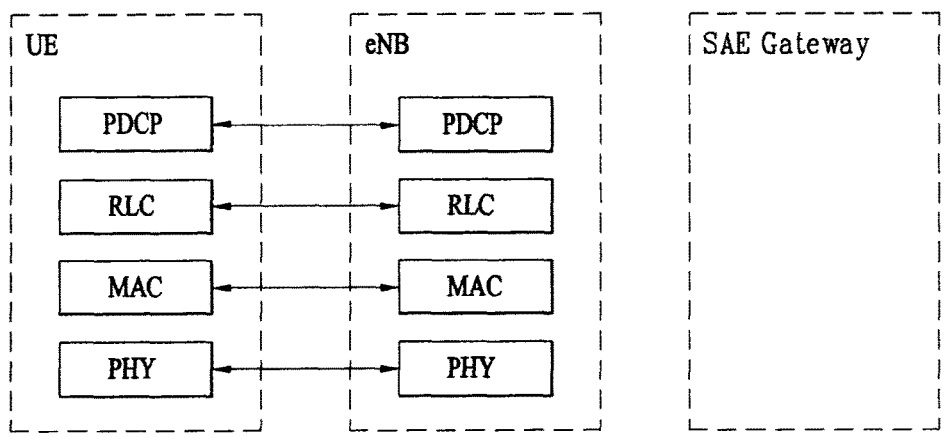

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constituting an eNB is set to one of the bandwidths of 1.44, 3, 5, 10, 15 and 20 Mhz and provides DL or UL transmission service to a plurality of UEs in the bandwidth. Different cells may be configured so as to provide different bandwidths DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
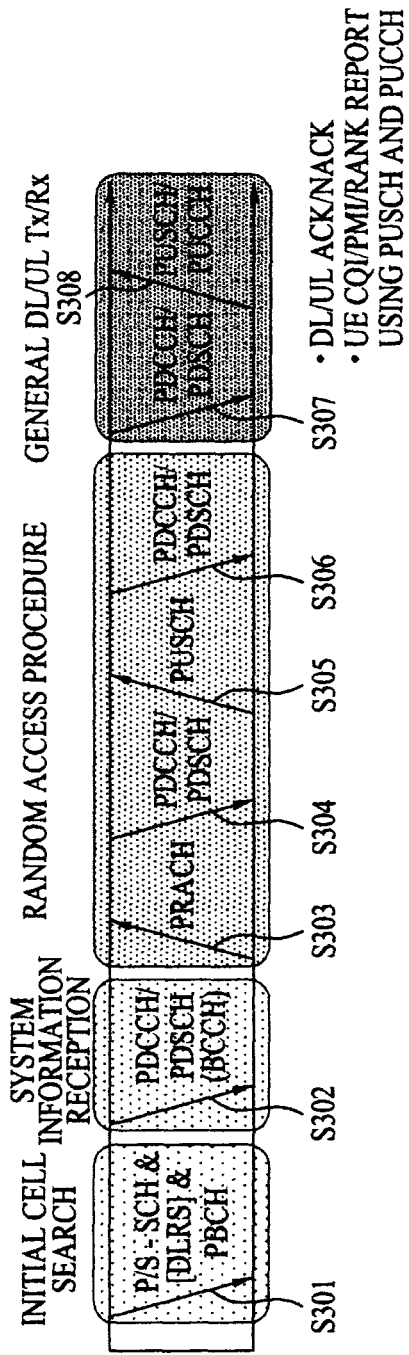
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
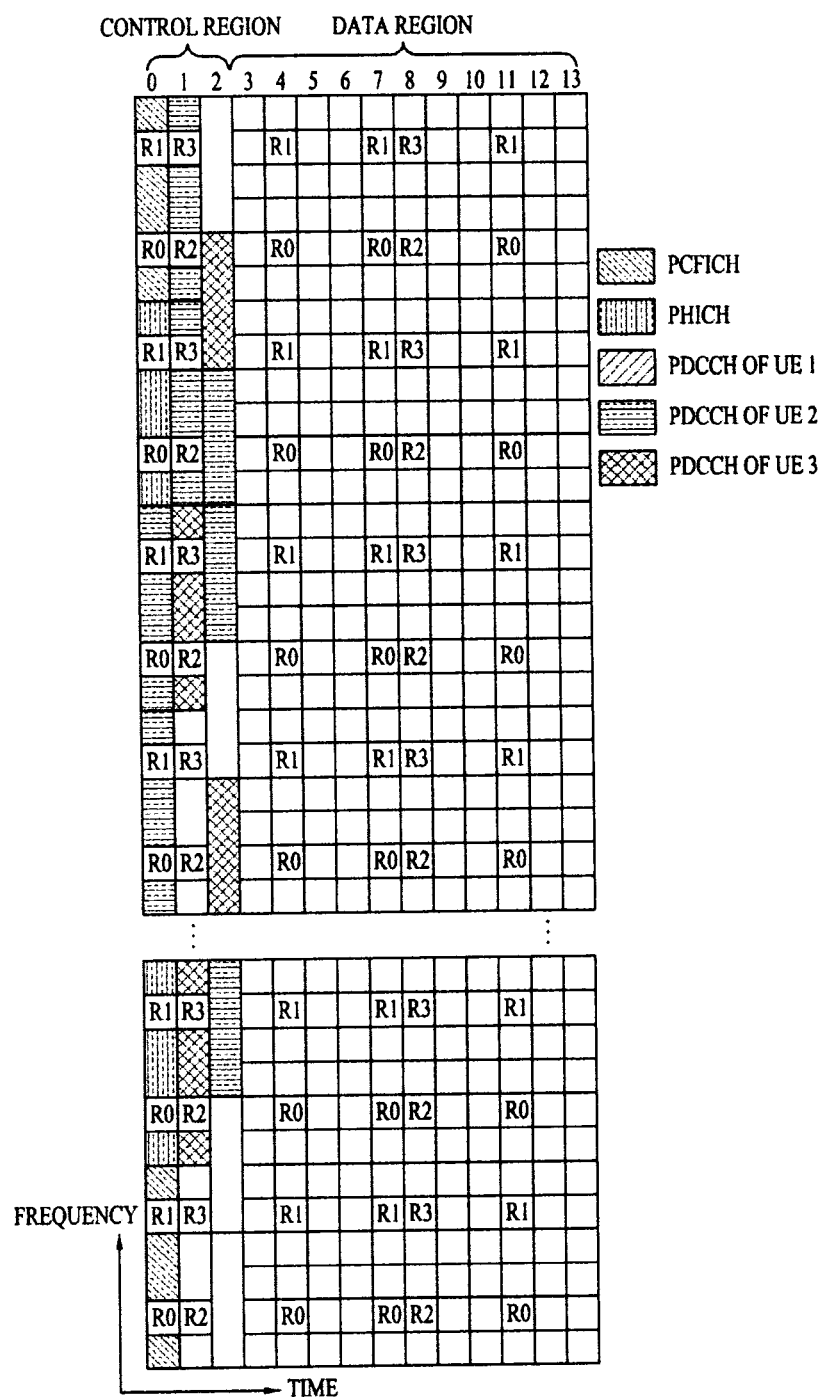
FIG. 4 is a diagram illustrating the structure of a DL radio frame used in an LTE system.

FIG. 4 is a diagram illustrating control channels contained in a control region of one subframe in a DL radio frame.

Referring to FIG. 4, one subframe includes 14 OFDM symbols. The first to third ones of the 14 OFDM symbols may be used as a control region and the remaining 11 to 13 OFDM symbols may be used as a data region, according to subframe configuration. In FIG. 4, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 5:
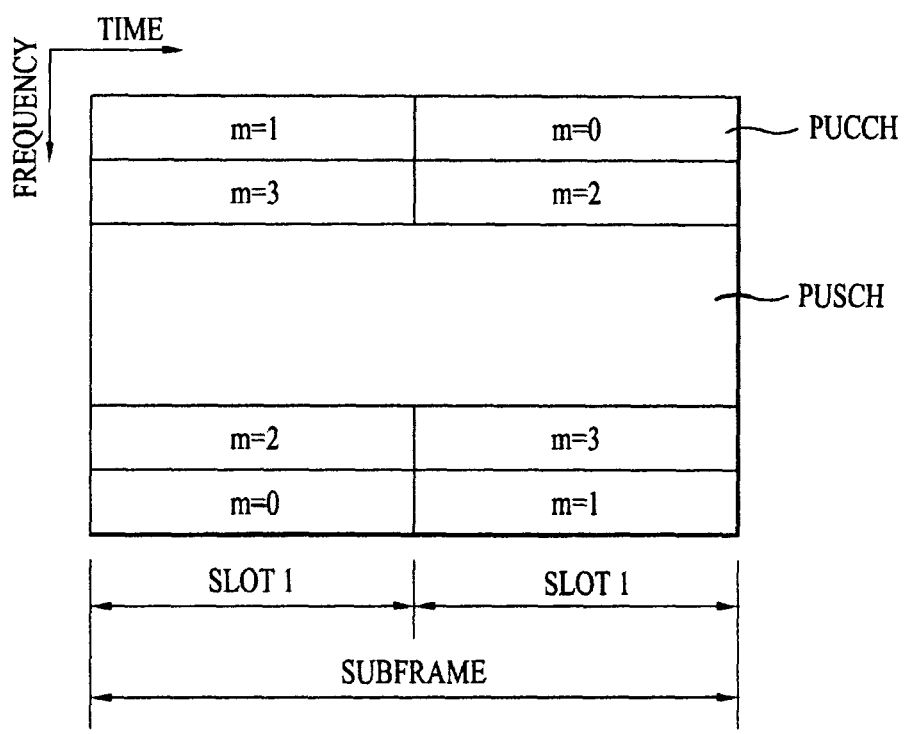
FIG. 5 is a diagram illustrating the structure of a UL subframe in an LTE system.

FIG. 5 is a diagram illustrating the structure of a UL subframe in an LTE system.

Referring to FIG. 5, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 5.

And, time capable of transmitting a sounding reference signal in a subframe corresponds to a symbol period lastly positioned in a subframe in a time axis and the sounding reference signal is transmitted through a data transmission band in frequency axis. Sounding reference signals of a plurality of UEs transmitted through a last symbol of an identical subframe can be distinguished from each other according to a frequency position.

Figure 6:
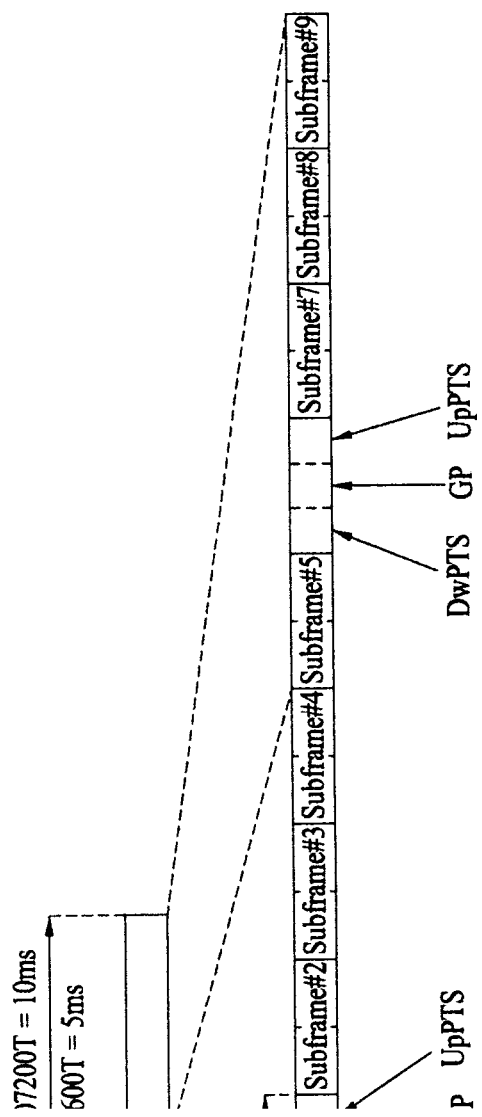
FIG. 6 illustrates a structure of a radio frame in an LTE TDD system.

FIG. 6 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in an LTE TDD system, a UL/DL configuration is shown in Table 1 below.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D, U, and S refer to a downlink subframe, an uplink subframe, and the special subframe. In addition, Table 1 also shows downlink-to-uplink switch-point periodicity in an uplink/downlink subframe configuration in each system.

Figure 7:
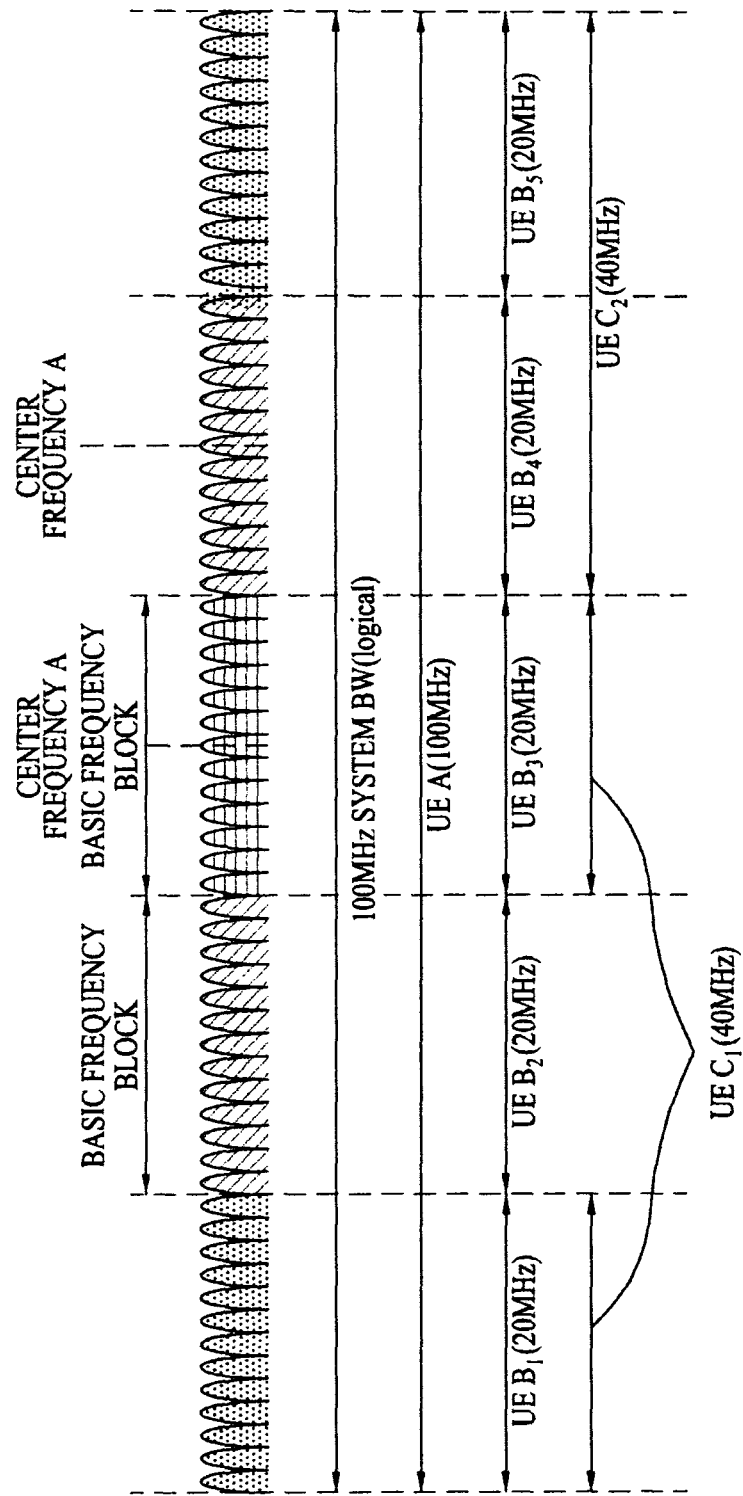
FIG. 7 is a view illustrating concept of a carrier aggregation scheme.

Hereinafter, a carrier aggregation scheme will be described. FIG. 7 is a view illustrating concept of a carrier aggregation scheme.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' will consistently used.

Figure 8:
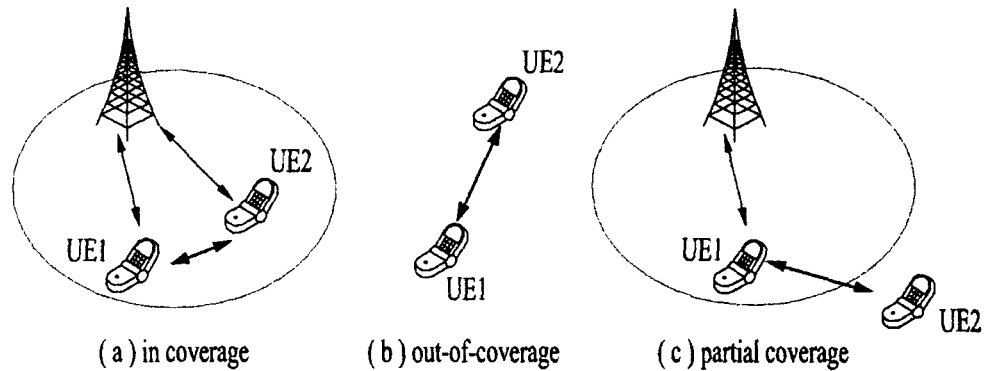
FIG. 8 is a diagram illustrating exemplary scenarios of D2D communication.

Referring to FIG. 7, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 7 illustrates the case in which component carriers have the same bandwidth, the case is purely exemplary, and thus, the component carriers may have different bandwidths. In addition, although FIG. 7 illustrates the case in which the component carriers are adjacent to each other in the frequency domain, FIG. 8 are logically illustrated, and thus, the component carriers may be physically adjacent to each other or may be spaced apart from each other.

Component carriers can use different center frequencies or use one common center frequency with respect to physically adjacent component carriers. For example, in FIG. 8, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers as illustrated in FIG. 7. In this case, a method for scheduling a data channel by a control channel may be classified into a linked carrier scheduling method and a cross carrier scheduling method.

In more detail, in the linked carrier scheduling method, a control channel transmitted through a specific component carrier schedules only a data channel through the specific component carrier like in a legacy LTE system using a single component carrier.

Meanwhile, in the cross carrier scheduling method, a control channel transmitted through a primary component carrier (primary CC) using a carrier indicator field (CIF) schedules a data channel transmitted through a data channel transmitted through the primary CC or a secondary CC.

A description will be given of a method for controlling uplink transmission power in an LTE system.

A method for controlling, by a UE, uplink transmission power thereof includes open loop power control (OLPC) and closed loop power control (CLPC). The former controls power in such a manner that attenuation of a downlink signal from a base station of a cell to which a UE belongs is estimated and compensated for. OLPC controls uplink power by increasing uplink transmission power when downlink signal attenuation increases as a distance between the UE and the base station increases. The latter controls uplink power in such a manner that the base station directly transmits information (i.e. a control signal) necessary to control uplink transmission power.

The following equation 1 is used to determine transmission power of a UE when a serving cell c transmits only a PUSCH instead of simultaneously transmitting the PUSCH and a PUCCH in a subframe corresponding to a subframe index i in a system that supports carrier aggregation.

Parameters, which will be described in association with Equations 1 and 2, determine uplink transmission power of a UE in the serving cell c. Here, $P_{CMAX,c}(i)$ in Equation 1 indicates maximum transmittable power of the UE in the subframe corresponding to the subframe index i and $\hat{P}_{CMAX,c}(i)$ in Equation 2 indicates a linear value of $P_{CMAX,c}(i)$. $\hat{P}_{PUCCH}(i)$ in Equation 2 indicates a linear value of $P_{PUCCH}(i)$ ($P_{PUCCH}(i)$ indicating PUCCH transmission power in the subframe corresponding to subframe index i).

In Equation 1, $M_{PUSCH,c}(i)$ is a parameter indicating a PUSCH resource allocation bandwidth, which is represented as the number of resource blocks valid for the subframe index i, and is allocated by a base station. $P_{O\_PUSCH,c}(j)$ is a parameter corresponding to the sum of a cell-specific nominal component $P_{O\_NOMINAL\_PUSCH,c}(j)$ provided by a higher layer and a UE-specific component $P_{O\_UE\_PUSCH,c}(j)$ provided by the higher layer and is signaled to the UE by the base station.

j is 1 in PUSCH transmission/retransmission according to an uplink grant and j is 2 in PUSCH transmission/retransmission according to a random access response. In addition, $P_{O\_UE\_PUSCH,c}(2)=0$ and $P_{O\_NOMINAL\_PUSCH,c}(2)=P_{O\_PRE}+\Delta_{PREAMBLE\_Msg3}$. Parameters $P_{O\_PRE}$ and $\Delta_{PREAMBLE\_Msg3}$ are signaled by the higher layer.

$\alpha_c(i)$ is a pathloss compensation factor and a cell-specific parameter provided by the higher layer and transmitted as 3 bits by the base station. $\alpha \in \{0, 0.4, 0.5, 0.6, 0.7, 0.8, 0.9, 1\}$ when j is 0 or 1 and $\alpha_c(j)=1$ when j is 2. $\alpha_c(j)$ is a value signaled to the UE by the base station.

Pathloss $PL_c$ is a downlink pathloss (or signal loss) estimate value in dBs, calculated by the UE, and is represented as $PL_c$=referenceSignalPower–higher layer filtered RSRP. Here, referenceSignalPower can be signaled to the UE by the base station via the higher layer.

$f_c(i)$ is a value indicating current PUSCH power control adjustment state for the subframe index i and can be represented as a current absolute value or accumulated value. When accumulation is enabled based on a parameter provided by the higher layer or a TPC command $\delta_{PUSCH,c}$ is included in a PDCCH along with DCI format 0 for the serving cell c in which CRC is scrambled with temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled through the PDCCH with DCI format 0/4 or 3/3A in a subframe i-$K_{PUSCH}$. Here, $f_c(0)$ is the first value after reset of the accumulated value.

$K_{PUSCH}$ is defined in LTE as follows.

For FDD (Frequency Division Duplex), $K_{PUSCH}$ has a value of 4. As to TDD, $K_{PUSCH}$ has values as shown in Table 2.

$$P_{PUSCH}(i) = \min \begin{cases} P_{CMAX}(i), \\ 10\log_{10}(M_{PUSCH}(i)) + P_{O\_PUSCH}(j) + \alpha_c(j) \cdot PL_c + \Delta_{TFc}(i) + f_c(i) \end{cases} [dBm] \quad \text{[Equation 1]}$$

The following equation 2 is used to determine PUSCH transmission power when the serving cell c simultaneously transmits the PUCCH and the PUSCH in the subframe corresponding to the subframe index i in a system supporting carrier aggregation.

$$P_{PUSCH}(i) = \min \begin{cases} 10\log_{10}(\hat{P}_{CMAX}(i) - \hat{P}_{PUCCH}(i)), \\ 10\log_{10}(M_{PUSCH}(i)) + P_{O\_PUSCH}(j) + \alpha_c(j) \cdot PL_c + \Delta_{TFc}(i) + f_c(i) \end{cases} [dBm] \quad \text{[Equation 2]}$$

TABLE 2

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The UE attempts to decode a PDCCH in DCI format 0/4 with C-RNTI thereof or to decode a PDCCH in DCI format 3/3A and a DCI format for SPS C-RNTI with TPC-PUSCH-RNTI thereof in each subframe in cases other than DRX state. When DCI formats 0/4 and 3/3A for the serving cell c are detected in the same subframe, the UE needs to use $\delta_{PUSCH,c}$ provided in DCI format 0/4. When a TPC command decoded for the serving cell c is not present, DRX is generated or a subframe having index i is a subframe other than an uplink subframe in TDD, $\delta_{PUSCH,c}$ is 0 dB.

Accumulated $\delta_{PUSCH,c}$, which is signaled together with DCI format 0/4 on a PDCCH, is shown in Table 3. When a PDCCH with DCI format 0 is validated through SPS activation or released, $\delta_{PUSCH,c}$ is 0 dB. Accumulated $\delta_{PUSCH,c}$, which is signaled with DCI format 3/3A on a PDCCH, is one of SET1 of Table 3 or one of SET2 of Table 4, determined by a TPC-index parameter provided by the higher layer.

TABLE 3

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 4

| TPC Command Field in DCI format 3A | Accumulated $\delta_{PUSCH,c}$ [dB] |
|---|---|
| 0 | −1 |
| 1 | 1 |

When the UE reaches maximum transmission power $\hat{P}_{CMAX}(i)$ in the serving cell c, a positive TPC command is not accumulated for the serving cell c. Conversely, when the UE reaches minimum transmission power, a negative TPC command is not accumulated.

The following equation 3 is related to uplink power control with respect to a PUCCH in LTE.

provided to the UE by the higher layer. In other cases, $\Delta_{TxD}(F')$ is 0. Parameters with respect to a cell having the cell index c will now be described.

$P_{CMAX,c}(i)$ indicates maximum transmission power of a UE, $P_{0\_PUCCH}$ is a parameter corresponding to the sum of cell-specific parameters and signaled by a base station through higher layer signaling, $PL_c$ is a downlink pathloss (or signal loss) estimate value calculated in dBs by the UE and is represented as $PL_c$=referenceSignalPower−higher layer filteredRSRP. h(n) is a value depending on PUCCH format, $n_{CQI}$ is the number of information bits with respect to channel quality information (CQI) and $n_{HARQ}$ indicates the number of HARQ bits. In addition, $\Delta_{F\_PUCCH}(F)$ is a relative value with respect to PUCCH format 1a and a value corresponding to PUCCH format #F, which is signaled by the base station through higher layer signaling. g(i) indicates a current PUCCH power control adjustment state of a subframe having index i.

g(0)=0 when $P_{O\_UE\_PUCCH}$ is changed in the higher layer and g(0)=$\Delta P_{ramping}+\delta_{msg2}$ otherwise. $\delta_{msg2}$ is a TPC command indicated in a random access response $\Delta P_{ramping}$ corresponds to total power ramp-up from the first to last preambles, provided by the higher layer.

When a UE reaches maximum transmission power $P_{CMAX,c}(i)$ in a primary cell, a positive TPC command is not accumulated for the primary cell. When the UE reaches minimum transmission power, a negative TPC command is not accumulated. The UE resets accumulation when $P_{O\_UE\_PUCCH}$ is changed by the higher layer or upon reception of a random access response.

Tables 5 and 6 show $\delta_{PUCCH}$ indicated by a TPC command in DCI formats. Particularly, Table 5 shows $\delta_{PUCCH}$ indicated in DCI formats other than DCI format 3A and Table 6 shows $\delta_{PUCCH}$ indicated in DCI format 3A.

TABLE 5

| TPC Command Field in DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 6

| TPC Command Field in DCI format 3A | $\delta_{PUCCH}$ [dB] |
|---|---|
| 0 | −1 |
| 1 | 1 |

[Equation 3]
$$P_{PUCCH}(i) = \min\begin{Bmatrix} P_{CMAX}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{Bmatrix}[dBm]$$

In Equation 3, i indicates a subframe index and c indicates a cell index. When a UE is configured by a higher layer to transmit a PUCCH over through antenna ports, $\Delta_{TxD}(F')$ is Equation 4 in the following corresponds to an equation related to power control of a sounding reference signal (SRS) in LTE system.

$$P_{SRS,c}(i) = \min \begin{cases} P_{CMAX,c}(i) \\ P_{SRS\_OFFSET,c}(m) + 10\log_{10}(M_{SRS,c}) + P_{O\_PUSCH,c}(j) + \alpha_c(j) \cdot PL_c + f_c(i) \end{cases} [dBm] \quad \text{[Equation 4]}$$

In Equation 4, i corresponds to a subframe index and c corresponds to a cell index. In this case, $P_{CMAX,c}(i)$ corresponds to maximum power capable of being transmitted by a UE and $P_{SRS\_OFFSET,c}(m)$ corresponds to a value configured by an upper layer. If m is 0, it may correspond to a case of transmitting a periodic sounding reference signal. If m is not 0, it may correspond to a case of transmitting an aperiodic sounding reference signal. $M_{SRS,c}$ corresponds to a sounding reference signal bandwidth on a subframe index i of a serving cell c and is represented by the number of resource blocks.

$f_c(i)$ corresponds to a value indicating a current PUSCH power control adjustment status for a subframe index i of a serving cell c. $P_{O\_PUSCH,c}(j)$ and $\alpha_c(j)$ are also identical to what is mentioned earlier in Equation 1 and 2.

Hereinafter, a Sounding Reference Signal (SRS) will be described.

The SRS is composed of constant amplitude zero auto correlation (CAZAC) sequences. SRSs transmitted from several UEs are CAZAC sequences $r^{SRS}(n) = r_{u,v}^{(\alpha)}(n)$ having different cyclic shift values α according to Equation 1.

$$\alpha = 2\pi \frac{n_{SRS}^{cs}}{8} \quad \text{[Equation 1]}$$

where, $n_{SRS}^{cs}$ is a value set to each UE by a higher layer and has an integer value of 0 to 7. Accordingly, the cyclic shift value may have eight values according to $n_{SRS}^{cs}$.

CAZAC sequences generated from one CAZAC sequence through cyclic shift have zero correlation values with sequences having different cyclic shift values. Using such property, SRSs of the same frequency domain may be divided according to CAZAC sequence cyclic shift values. The SRS of each UE is allocated onto the frequency axis according to a parameter set by the eNB. The UE performs frequency hopping of the SRS so as to transmit the SRS with an overall uplink data transmission bandwidth.

Hereinafter, a detailed method of mapping physical resources for transmitting SRSs in an LTE system will be described.

In order to satisfy transmit power $P_{SRS}$ of a UE, an SRS sequence $r^{SRS}(n)$ is first multiplied by an amplitude scaling factor $\beta_{SRS}$ and is then mapped to a resource element (RE) having an index (k, l) from $r^{SRS}(0)$ by Equation 6.

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \quad \text{[Equation 6]}$$

where, $k_0$ denotes a frequency domain start point of an SRS and is defined by Equation 7.

$$k_0 = k_0' + \sum_{b=0}^{B_{SRS}} 2M_{sc,b}^{RS} n_b \quad \text{[Equation 7]}$$

where, $n_b$ denotes a frequency location index. $k'_0$ for a general uplink subframe is defined by Equation 8 and $k'_0$ for an uplink pilot time is defined by Equation 9.

$$k_0' = (\lfloor N_{RB}^{UL}/2 \rfloor - m_{SRS,0}/2)N_{SC}^{RB} + k_{TC} \quad \text{[Equation 8]}$$

$$k_0' = \begin{cases} (N_{RB}^{UL} - m_{SRS,0}^{max})N_{sc}^{RB} + k_{TC} & \text{if } ((n_f \bmod 2) \times (2 - N_{SP}) + n_{hf}) \bmod 2 = 0 \\ k_{TC} & \text{otherwise} \end{cases} \quad \text{[Equation 9]}$$

In Equations 4 and 5, $k_{TC}$ denotes a transmissionComb parameter signaled to a UE via a higher layer and has a value of 0 or 1. In addition, $n_{hf}$ is 0 in an uplink pilot time slot of a first half frame and is 0 an uplink pilot slot of a second half frame. $M_{sc,b}^{RS}$ is the length, that is, the bandwidth, if the SRS sequence expressed in subcarrier units defined by Equation 10.

$$M_{sc,b}^{RS} = m_{SRS,b} N_{sc}^{RB}/2 \quad \text{[Equation 10]}$$

In Equation 10, $m_{SRS,b}$ is a value signaled from an eNB according to an uplink bandwidth $N_{RB}^{UL}$.

The UE may perform frequency hopping of the SRS so as to transmit the SRS with the overall uplink data transmission bandwidth. Such frequency hopping is set by a parameter $b_{hop}$ having a value of 0 to 3 received from a higher layer.

If frequency hopping of the SRS is inactivated, that is, if $b_{hop} \geq B_{SRS}$, a frequency location index $n_b$ has a constant value as shown in Equation 11. Here, $n_{RRC}$ is a parameter received from a higher layer.

$$n_b = \lfloor 4n_{RRC}/m_{SRS,b} \rfloor \bmod N_b \quad \text{[Equation 11]}$$

Meanwhile, if frequency hopping of the SRS is activated, that is, $b_{hop} < B_{SRS}$, a frequency location index $n_b$ is defined by Equations 12 and 13.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod B_b & \text{otherwise} \end{cases} \quad \text{[Equation 12]}$$

-continued $$F_b(n_{SRS}) = \begin{cases} (N_b/2) \left\lfloor \dfrac{n_{SRS} \bmod \Pi^b_{b'=b_{hop}} N_{b'}}{\Pi^{b-1}_{b'=b_{hop}} N_{b'}} \right\rfloor + \left\lfloor \dfrac{n_{SRS} \bmod \Pi^b_{b'=b_{hop}} N_{b'}}{2\Pi^{b-1}_{b'=b_{hop}} N_{b'}} \right\rfloor & \text{if } N_b \text{ even} \\ \lfloor N_b/2 \rfloor \lfloor n_{SRS}/\Pi^{b-1}_{b'=b_{hop}} N_{b'} \rfloor & \text{if } N_b \text{ odd} \end{cases}$$

[Equation 13]

where, $n_{SRS}$ is a parameter used to calculate the number of times of transmitting the SRS and is defined by Equation 14.

$$n_{SRS} = \begin{cases} 2N_{SP}n_f + 2(N_{SP}-1)\left\lfloor \dfrac{n_s}{10} \right\rfloor + \left\lfloor \dfrac{T_{offset}}{T_{offset\_max}} \right\rfloor, & \text{for 2ms SRS periodicity of TDD frame structure} \\ \lfloor (n_f \times 10 + \lfloor n_s/2 \rfloor)/T_{SRS} \rfloor, & \text{otherwise} \end{cases}$$

[Equation 14]

In Equation 14, $T_{SRS}$ denotes the periodicity of an SRS and $T_{offset}$ denotes a subframe offset of an SRS. In addition, $n_s$ denotes a slot number and $n_f$ denotes a frame number.

A UE-specific SRS configuration index $I_{SRS}$ for setting the periodicity $T_{SRS}$ and the subframe offset $T_{offset}$ of a UE-specific SRS signal is shown in Table 7-Table 10 according to FDD and TDD. In particular, Table 7 and Table 8 indicate a FDD system and a TDD system, respectively. Table 7 and Table 8 in the following show a period related to a triggering type 0, i.e., a periodic SRS, and offset information.

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |

TABLE 7-continued

| SRS Configuration Index $I_{SRS}$ | SRS Periodicity $T_{SRS}$ (ms) | SRS Subframe Offset $T_{offset}$ |
|---|---|---|
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 8

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

Meanwhile, in case of the periodic SRS, transmission is performed in a subframe satisfying Equation 15 in the following in a FDD system or a TDD system where $T_{SRS}$ is greater than 2 ($T_{SRS}$>2). Yet, in Equation 15, $k_{SRS}$ corresponds to $\{0, 1, \ldots, 9\}$ in case of the FDD system, whereas $k_{SRS}$ is determined according to Table 9 in the following in case of the TDD system.

$$(10 \cdot n_f + k_{SRS} - T_{offset}) \bmod T_{SRS} = 0$$

[Equation 15]

TABLE 9

| | subframe index n | | | | | | | | | |
|---|---|---|---|---|---|---|---|---|---|---|
| | | 1 | | | | | 6 | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | | 1 | | 2 | 3 | 4 | | 6 | | 7 | 8 | 9 |

And, in case of a TDD system where $T_{SRS}$ corresponds to 2 in Table 8, transmission is performed in a subframe satisfying Equation 16 in the following.

$$(k_{SRS} - T_{offset}) \bmod 5 = 0$$

[Equation 16]

Table 10 and Table 11 in the following show a period related to a triggering type 1, i.e., an aperiodic SRS, and offset information. In particular, Table 10 and Table 11 indicate a FDD system and a TDD system, respectively.

TABLE 10

| SRS Configuration Index $I_{SRS}$ | SRS Periodicity $T_{SRS,1}$ (ms) | SRS Subframe Offset $T_{offset,1}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-31 | reserved | reserved |

TABLE 11

| SRS Configuration Index $I_{SRS}$ | SRS Periodicity $T_{SRS,1}$ (ms) | SRS Subframe Offset $T_{offset,1}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-31 | reserved | reserved |

Meanwhile, if a triggering bit of the aperiodic SRS is detected in a subframe #n, an aperiodic SRS corresponding to the triggering bit is transmitted in a first subframe satisfying Equation 17 or Equation 18 in the following appearing after a subframe index #n+k (where k≥4). In particular, Equation 17 in the following is used for a FDD system or a TDD system of which $T_{SRS}$ is greater than 2 ($T_{SRS}$>2) in the Table 11. Equation 18 in the following is used for a TDD system of which $T_{SRS}$ is equal to 2 ($T_{SRS}$=2) in the Table 11. Yet, in case of the FDD system, $k_{SRS}$ corresponds to {0, 1, . . . , 9}. In case of the TDD system, $k_{SRS}$ is determined according to the Table 9.

$$(10 \cdot n_f + k_{SRS} - T_{offset,1}) \bmod T_{SRS,1} = 0 \quad \text{[Equation 17]}$$

$$(k_{SRS} - T_{offset,1}) \bmod 5 = 0 \quad \text{[Equation 18]}$$

D2D (Device to Device) Communication

In the following, D2D communication based on LTE system is explained. D2D can be referred to as direct communication between UEs or a sidelink. In general, a UE corresponds to a terminal of a user. If such a network device as an eNB transmits and receives a signal according to a D2D communication scheme, the network device can also be considered as a UE as well.

FIG. 8 is a diagram illustrating exemplary scenarios of D2D communication. D2D resources can be allocated from a UL resource (e.g., In case of FDD, a UL frequency resource. In case of TDD, a UL subframe). (a) In case of in-coverage D2D communication, a network controls D2D resources used for D2D communication. The network may allocate a specific resource to a transmission UE or may allocate a pool of D2D resources capable of being selected by a UE. (b) In case of out-of-coverage D2D communication, since a network is unable to directly control a D2D resource, a UE uses a preconfigured D2D resource. (c) In case of partial coverage D2D communication, a UE, which is located at the outside of the coverage, is able to use preconfigured parameters. On the contrary, a UE, which is located within the coverage, is able to use a D2D resource obtained from the network.

For clarity, assume that a UE1 selects a resource unit (RU) corresponding to a specific D2D resource from a resource pool and the UE1 transmits a D2D signal using the selected RS. A resource pool corresponds to a set of D2D resources. Assume that a UE2 corresponding to a reception UE receives information on a resource pool in which the UE1 is able to transmit a signal and detects a signal of the UE1 in the resource pool. In this case, if the UE1 is located within a connection range of an eNB, the eNB can inform the UE1 of information on the resource pool. If the UE1 is located at the outside of the connection range of the eNB, the resource pool can be informed by a different UE or can be determined by a predetermined resource. In general, a resource pool includes a plurality of RUs. A UE selects one or more RUs and may be able to use the selected RUs for transmitting a D2D signal of the UE.

Figure 9:
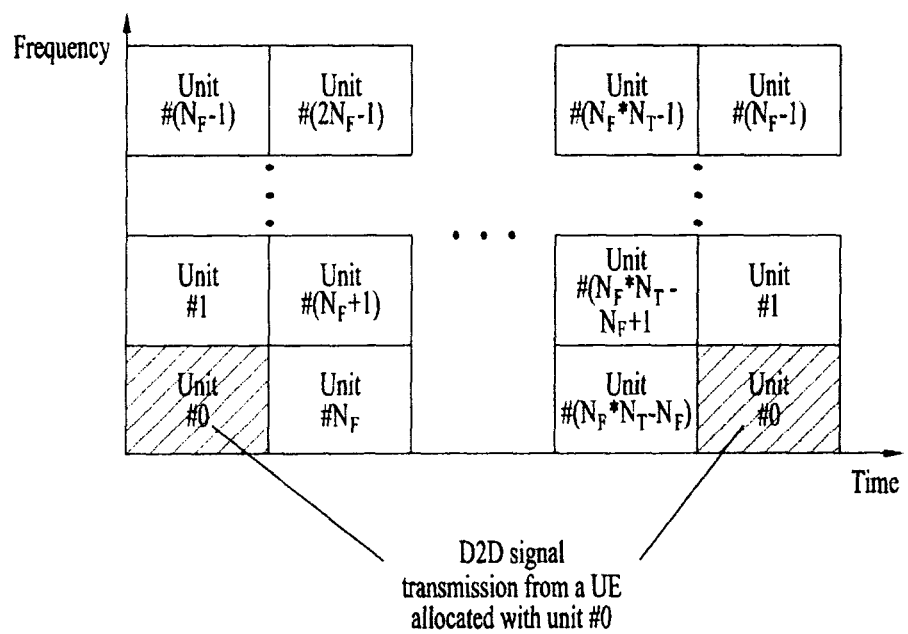
FIG. 9 is a diagram illustrating an example of a D2D RU.

FIG. 9 is a diagram illustrating an example of a D2D RU. For clarity, assume that the entire frequency resources are divided into the $N_F$ number of resource units and the entire time resources are divided into the $N_T$ number of resource units.

In FIG. 9, a resource pool can be repeated with a period of $N_T$ subframes. For example, as shown in FIG. 9, one resource unit may periodically and repeatedly appear.

Or, an index of a physical RU to which a logical RU is mapped may change based on a predetermined pattern over time to obtain a diversity gain in time domain and/or frequency domain. In this RU structure, a resource pool may correspond to a set of resource units capable of being used by a UE intending to transmit a D2D signal.

The aforementioned resource pool can be classified into various types. For example, the resource pool can be classified according to contents of a D2D signal transmitted via each resource pool. For example, the contents of the D2D signal can be classified as follows and a separate resource pool can be configured according to contents of each D2D signal.

Scheduling assignment (SA): The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical RU in a manner of being multiplexed with D2D data. In this case, an SA resource pool may correspond to a pool of resources that an SA and D2D data are transmitted in a manner of being multiplexed. The SA can be referred to as an SCI (side link control channel) and can be transmitted via a D2D control channel (e.g., PSCCH).

D2D data channel: The D2D data channel corresponds to a channel for transmitting user data scheduled by the SA. It may be able to configure a pool of resources for the D2D data channel.

Discovery channel: The discovery channel corresponds to a channel for transmitting a discovery signal including information on an ID of a transmission UE, and the like to enable a neighboring UE to discover the transmission UE. It may be able to configure a resource pool for the discovery channel.

Meanwhile, although contents of D2D signal are identical to each other, it may use a different resource pool according to a transmission/reception attribute of the D2D signal. For example, in case of a D2D data channel of the same type or a discovery channel of the same type, the D2D data channel or the discovery channel can be transmitted in a different resource pool in consideration of (i) a transmission timing determination scheme of a D2D signal (e.g., whether a D2D signal is transmitted at the time of receiving a synchronization reference signal or the timing to which a prescribed timing advance is added), (ii) a resource allocation scheme (e.g., whether a transmission resource of an individual D2D signal is designated by an eNB or a transmission UE autonomously selects a D2D signal transmission resource from a resource pool), (iii) a signal format (e.g., number of symbols occupied by a D2D signal in a subframe, number of subframes used for transmitting a D2D signal), (iv) signal strength from an eNB, (v) strength of transmit power of a D2D UE, and the like.

As mentioned in the foregoing description, such a term as 'D2D' can also be referred to as 'SL (side link)' and 'SA' can also be referred to as PSSCH (physical sidelink control channel). A D2D synchronization signal can be referred to as an SSS (sidelink synchronization signal) and the SSS can be transmitted via a PSBCH (physical sidelink broadcast channel). The PSBCH transmits most basic information (e.g., system information such as SL-MIB, etc.) prior to D2D communication and can also be referred to as a PD2DSCH (physical D2D synchronization channel). A UE transmits a signal (e.g., a discovery signal including an ID of the UE) to a neighboring UE using a discovery channel to inform the neighboring UE of the existence of the UE. The discovery channel is referred to as a PSDCH (physical sidelink discovery channel).

D2D communication of a narrow sense can be distinguished from D2D discovery. For example, if only a UE performing the D2D communication of a narrow sense transmits PSBCH together with SSS (except a UE performing D2D discovery), the SSS can be measured using a DMRS of the PSBCH. An out-of-coverage UE measures the DMRS of the PSBCH (e.g., RSRP, etc.) and may be then able to determine whether or not the UE becomes a synchronization source based on a measurement result.

Figure 10:
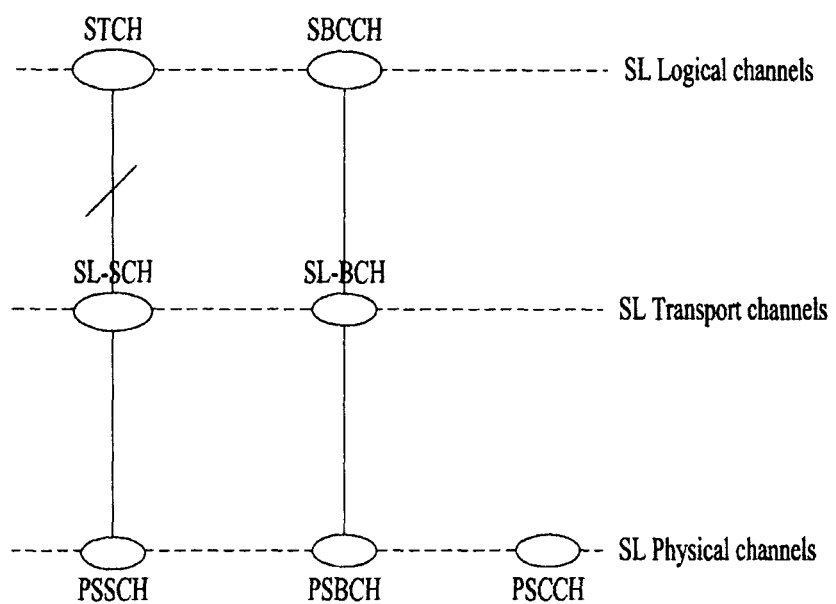
FIG. 10 is a diagram illustrating SL (side link) channels.

FIG. 10 is a diagram illustrating SL (side link) channels. The SL channels shown in FIG. 9 may correspond to channels for performing D2D communication (e.g., D2D communication of a narrow sense).

Referring to FIG. 10, STCH (SL traffic channel) and SBCCH (SL broadcast control channel) correspond to logical channels. The STCH transmits user data received from an application and is connected with SL-SCH (SL shared channel). The SL-SCH corresponding to a transport channel is connected with PSSCH (physical SL shared channel). The SC-SCH signals information necessary for performing synchronization in out-of-coverage or partial coverage scenario or information necessary for performing synchronization between UEs belonging to a different cell. The SBCCH is connected with SL-BCH corresponding to a transport channel. The SC-BCH is connected with PSBCH.

PSCCH (physical SL control channel) performs a role similar to a role of PDCCH in legacy communication performed between a UE and an eNB. The PSCCH is used to transmit SA (scheduling assignment). The SA can also be referred to as SCI (sidelink control information).

For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

For example, in the mode 1, an eNB designates a resource to be used for D2D communication in a resource pool. In the mode 2, a UE selects a resource pool from a set of allocated resource pools and may be able to directly select a D2D resource to be used from the selected resource pool. Hence, it is necessary for the UE to be in an RRC connected state in the mode 1. On the contrary, the UE may be in an RRC idle state or an out-of-coverage state in the mode 2.

Figure 11:
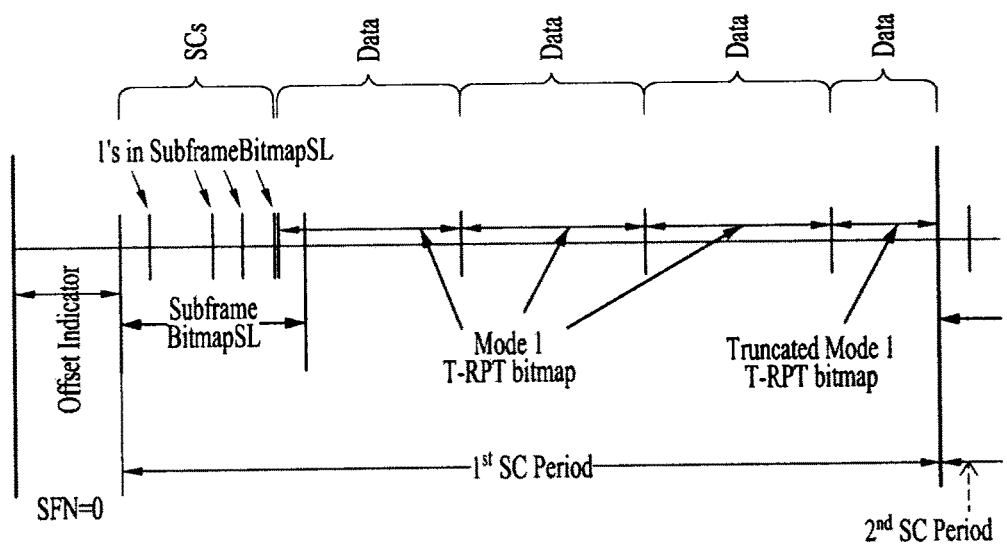
FIG. 11 is a diagram illustrating a D2D communication mode 1.

FIG. 11 is a diagram illustrating a D2D communication mode 1. According to a PSSCH/PSSCH structure for performing D2D communication, a set of subframes (i.e., a subframe bitmap) is divided into two regions (e.g., a control region and a data region). Whether or not a subframe is usable for D2D communication can be indicated via a subframe bitmap.

Referring to FIG. 11, an SC period (SL control period) starts from an offset of SFN=0 and can be periodically repeated. The SC period starts from a control region including SCI transmitted by PSCCH and 'SubframeBitmapSL' corresponding to a higher layer parameter indicates a subframe in which PSCCH is transmitted. A data region starts after the last bit configured by 1 in the 'SubframeBitmapSL'. The data region corresponds to a T-RPT bitmap corresponding to a different bitmap. The T-RPT bitmap indicates subframes in which data is transmitted. As shown in FIG. 11, a subframe pattern indicated by the T-RPT bitmap is repeated until the SC period ends. The last T-RPT bitmap is truncated according to the end of the SC-period. The T-RPT bitmap can be dynamically configured and can be differently configured according to each SC-period and each UE.

In most part, the mode 2 operates in a manner of being similar to the mode 1 shown in FIG. 11. Yet, there is a difference between the mode 1 and the mode 2 in that a start point of a data region is not determined based on SubframeBitmapSL in the mode 2. In the mode 2, the start point of the data region has a fixed offset from a start point of an SC period Location Measurement in LTE System In LTE system, an location position protocol (LPP) has been introduced. In an LPP model, a location server can transmit assistance data for positioning to a user equipment (UE). In particular, the location server can transmit the assistance data to the UE to enable the UE to use an OTDOA/A-GNSS scheme. According to the LPP model, the UE uses a reference signal for positioning (e.g., a positioning RS) and transmits measurement information or location information included in the RS to the location server (e.g., E-SMLC/SLP). A final location is determined by the location server. The location information and a transmission/reception scheme between the UE and the location server are regulated by an LPP regulation. The LPP regulation can include IE for the location information and a signaling procedure.

An LPP technology mainly includes functions of 3 types. A first type is an A-GNSS (Assisted Global Navigation Satellite System) scheme, a second type is an OTDOA (Observed Time Differential Of Arrival) scheme, and a third type is an E-CID (Enhanced Cell ID) scheme.

The A-GNSS scheme corresponds to a satellite-based positioning scheme. Since basic satellite information for performing positioning is received through a wireless network (e.g., LTE), it is able to reduce time taken for determining an initial position. In case of the A-GNSS scheme, it may be able to obtain accurate location information via communication performed between a GPS and a location server of a network.

According to the OTDOA scheme, such a measurement value as an RSTD (Reference Signal Time Difference) is used to calculate a propagation time difference between a reference base station and a neighboring base station. In particular, a signal of a specific frame is received from the neighboring base station. In this case, among delayed tabs received from the reference base station for the frame, a tab closest to a tab received from the neighboring base station is selected and a time difference between the tabs is calculated as an RSTD value. Hence, performance may vary depending on a valid tab estimation scheme. In particular, according to the OTDOA scheme, a UE is able to calculate a distance and a location using an arrival time difference of signals received from a plurality of base stations (cells).

The E-CID scheme corresponds to a scheme of narrowing down a location of a UE by combining a legacy CID (cell ID) scheme with an RSSI (received signal strength indication) scheme in a hybrid manner. As measurement values related to the E-CID scheme, RSRP (Reference Signal Received Power, RSRP) and RSRQ (Reference Signal Received Power, RSRQ) are provided. The E-CID scheme corresponds to a scheme for estimating a location of a UE using round trip measurement, pathloss related measurement, and angle of arrival measurement through a method of analyzing such an OFDMA signal of LTE as RSRP.

Location Measurement Using Magnetic Field

The aforementioned RF signal-based location measurement methods have a demerit in that measurement accuracy is decreased in indoor environment. In order to solve the problem, a method of precisely measuring a location using a magnetic field is proposed in the following.

A magnetic field is differently measured with respect to an indoor location in accordance with a form of a building, in particular, a steel-frame structure. On the contrary, the magnetic field has a characteristic robust to elements causing interference/obstacle to an RF signal. In particular, it is known as indoor positioning using a magnetic field has a less location positioning error, which occurs due to distortion of an electromagnetic signal distorted according to whether or not a person exists in indoor, a change of furniture arrangement, and the like according to time, compared to a pattern matching scheme (e.g., WiFi, Bluetooth, etc.) using an electromagnetic signal. Hence, it may be able to utilize a magnetic field measurement value for performing indoor positioning based on the characteristic of the magnetic field.

In order to perform magnetic field-based positioning, it may be necessary to preferentially have a DB (database) for magnetic field information according to a location of a building. Since a characteristic of a magnetic field varies according to a location in a building, if a DB for magnetic field information is configured according to a location, it may be able to find out a current location of a UE by comparing the magnetic field information of the DB with a currently measured magnetic field value.

For clarity, a method of measuring signal strength of a magnetic field, comparing a measurement result with a DB, and estimating an indoor location is referred to as MFPM (magnetic field pattern matching).

Although it is able to use the MFPM itself for estimating an indoor location, if the MFPM is interlocked with a different sensor or a different positioning scheme, it may be able to increase accuracy of location measurement. For example, since a UE is equipped with a gyroscope sensor, an acceleration sensor, an e-compass sensor, a barometer sensor, and the like, it may be able to estimate an indoor location of the UE using sensor information and a magnetic field measurement value together.

And, if the MFPM is interlocked with at least one selected from the group consisting of a legacy cellular network-based positioning scheme (e.g., OTDOA, UTDOA, (E)CID), a WiFi-based positioning scheme (e.g., RSSI measurement, RF pattern matching), and a GPS satellite signal-based positioning scheme, accuracy of the magnetic field-based location estimation scheme can be enhanced.

In the following, a signaling method corresponding to a method of transmitting feedback on a magnetic field value measured by a UE to a network and/or a method of finding out a location by combining the measured magnetic field value with different sensor information in a hybrid manner are explained in detail.

In the following, for clarity, a location server may correspond to a network node that stores DB values of magnetic field strength according to a location. For example, the location server may support a positioning scheme of a legacy cellular-based location estimation system. Or, when a separate server rather than a location server supports the legacy cellular-based location estimation system, the location server may include a server configured to finally find out a location of a UE in a manner of being logically interlocked with a magnetic field-based location estimation system, or a network node.

Method 1

A UE can feed back an MFM (magnetic field measurement) value to a location server via physical layer signaling or higher layer signaling.

For example, the UE feeds back the MFM value to an eNB using RRC signaling and the eNB signals the information to the location server via an LPPa protocol. As a different method, the UE may feedback the MFM value to the eNB and/or the location server using an LPP protocol.

In order to perform the feedback, a field for transmitting the MFM can be added to the LPP or the LPPa protocol. For example, if a new measurement value such as MFM is added to the cellular-based positioning scheme, a location server communicating with a server storing a DB of the MFM in advance according to a location or a server storing a DB of the MFM can find out a location of a UE. The UE can signal a unique value of MFM, i.e., a raw MFM value, to an eNB, a network node, or a server. Or, according to a different embodiment, the UE recognizes surrounding environment and may be able to signal a corrected MFM value (e.g., a value corrected from the raw MFM value) to the eNB, the network node, or the server. For example, if an error occurs in an MFM value measured in certain environment and the UE knows that it is necessary to correct the MFM value or if the eNB or the network node signals the UE that it is necessary to correct the MFM value in a corresponding region, the UE can signal the corrected MFM value rather than the raw MFM value. For example, if a form of a steel-frame structure of a building is changed at a specific time slot (e.g., if a structure is changed (a building rotates or a bridge opens/closes) and a magnetic field characteristic is changed), a network can inform the UE of a correction factor (e.g., a form of multiplication or sum of specific factors) to be applied to the MFM according to a time slot. If the UE feedbacks the corrected MFM value, the UE is able to feedback more accurate MFM measurement information. Or, if the MFM field is changed according to time, the UE can feedback information on time at which the MFM is measured together with the MFM measurement value. If the location server has a DB (e.g., a DB of MFM), which varies according to time, the location server can compare the DB with a corresponding DB at a time slot at which the MFM measurement is performed by the UE.

In particular, if the UE feedbacks the MFM value, since a measurement value of a magnetic field is added to the legacy cellular network-based positioning scheme, it may be able to increase the accuracy of location estimation.

Meanwhile, the MFM can be differently measured according to an orientation of a UE held by a user. In this case, the orientation of the UE can be expressed by x, y, z coordinate system, a cylinder coordinate system, or a spherical coordinate system, by which the present invention may be non-limited.

Hence, the UE may feedback an orientation value (e.g., 3 types of scalar value according to a form of a coordinate system) of the UE obtained by a gyroscope sensor or the like to the location server together with the MFM value (e.g., via higher layer signaling such as LPP, RRC+LPPa, etc.). The location server stores a DB of MFM value according to an orientation of the UE and may be able to estimate the orientation of the UE using a different MFM value.

Although the UE may simply feedback an MFM value of a specific point, the UE may feedback MFM values of a plurality of points. In this case, although the UE is unable to know an absolute location of the UE, the UE is able to identify a moving distance (e.g., a size and/or a direction of displacement) using an acceleration sensor or the like. In particular, the UE is able to feedback an MFM value according to a moving distance to the location server at a plurality of points using the acceleration sensor or the like.

Specifically, it may be able to identify a moving trajectory via an acceleration sensor and/or a gyroscope sensor of the UE. For example, the moving trajectory can be represented in a form of x, y, z coordinate based on a reference point (e.g., an initial MFM measurement point, a predetermined location, or a measurement point of a predetermined order). If the UE moves in a straight line, the moving trajectory can be represented in a vector form. If the UE moves in a curve form according to time, the moving trajectory of the UE can be represented in a form of a plurality of divided vectors. For example, if a curve on which the UE moves is divided by N and each of the divided sections is modeled using a straight line, the moving trajectory of the UE can be represented by a straight line vector.

The UE feedbacks an MFM value measured at each point of the moving trajectory to the location server and may be able to feedback a (relative) location of the UE on the trajectory and/or a vector value to the location server together with the MFM value.

Meanwhile, the UE can feedback not only the MFM value but also a difference value (e.g., an amount of change) of the MFM value. For example, the UE may feedback an MFM measurement value measured at a first measurement point, an MFM value measured at an end point or center measurement points of a moving trajectory and/or a difference from a first MFM measurement value. In case of the first MFM measurement, a measurement value itself is transmitted. Yet, when MFM values are measured after the first MFM measurement, if a change amount is fed back only based on the first measurement value, it may be able to reduce signaling overhead or it may be able to increase feedback accuracy under the condition of the same signaling overhead.

In particular, when MFPM is performed, if an MFM pattern is compared with a DB using a plurality of MFM values on a moving trajectory of the UE rather than a single MFM value, it may be able to increase the accuracy of location estimation. In other word, it may be able to more precisely estimate a location by comparing a plurality of MFM values with each other instead of comparing an MFM value of a specific location with a DB.

As a different method, when the UE measures MFM, the UE may feedback a measurement value sensed by an acceleration sensor according to time to the location server (e.g., via physical layer signaling or higher layer signaling).

In the present specification, unless there is special citation, one of the aforementioned signaling methods can be used to feedback a new parameter (e.g., a parameter related to MFM-based location measurement).

The location server estimates a location of the UE based on a parameter fed back by the UE and feedbacks the estimated location of the UE to the UE via physical layer signaling or higher layer signaling. For example, the location server may preferentially signal location information of the UE to an eNB or a WiFi AP and the eNB or the WiFi AP may signal the location information to the UE via physical layer signaling or higher layer signaling.

Method 2

Although a UE is located at outdoor or a different building, if an MFM value of a specific building is matched with an MFM value stored in a DB of a location server, the location server may inform the UE of a wrong location.

In order to prevent the location confusion, it may utilize a legacy electromagnetic signal-based location estimation scheme or a location estimation scheme using a different sensor (e.g., barometer sensor).

For example, when a UE detects/camps on/is associated with WiFi or an indoor small cell, the UE can signal RSSI of a corresponding WiFi AP, an RSRP value of the indoor small cell, or information on whether or not the UE detects/camps on/is associated with the cell to a location server. By doing so, it is able to prevent the location server from being matched with an MFM value of a different building.

To this end, when the eNB or the WiFi AP transmits an MFM value to the location server, the eNB or the WiFi AP can transmit all or a part of an ID of the UE, an ID of the cell, a location of the cell, RSRP, a location of the connected WiFi AP, an ID of the WiFi AP, RSSI with the WiFi AP, and information on whether or not detection/camping/associated is performed to the location server. For example, if the eNB or the WiFi AP recognizes that a UE searching for a location accesses a cell or an AP of the eNB or the WiFi AP, the eNB or the WiFi AP can transmit a location of the cell or the AP to the location server. Hence, when the location server performs MFPM, the location server is able to know an approximate location of the UE.

Or, if an RSTD measurement value for OTDOA or location information of the UE measured by the OTDOA is fed back to the network/location server together with an MFM value, the location server can estimate a location of the UE by utilizing both the OTDOA and the MFPM.

Or, the UE detects a GPS satellite signal and may be able to feedback location information of the UE obtained from the satellite signal to the network/location server together with an MFM value.

Meanwhile, when the UE stores DB values for MFM, the UE can determine a DB to be compared with a measured MFM value among DBs stored in the UE via auxiliary information obtained via a different positioning scheme. For example, the UE stores the DB values for MFM when the UE downloads a DB of a specific region or downloads MFM DB information on a region frequently visited by the UE when a specific application is executed in the UE, by which the present invention may be non-limited. To this end, the specific application may send a push alarm to a user to make the user identify the region frequently visited by the UE and download MFM DB of the region.

The UE may identify a floor at which the UE is located via a Bluetooth sensor, identify an altitude via a barometer sensor, or identify a floor at which the UE is located or an approximate location of the UE via a network-based positioning scheme (e.g., OTDOA, UTDOA, (E)CID). If the network-based positioning scheme is able to increase the accuracy in measuring a location of the UE, a network signals an approximate location of the UE to the UE via physical layer signaling or higher layer signaling. Subsequently, the UE selects a magnetic field data to be compared with a measured MFM from among DBs stored in the UE and may be then able to more precisely estimate a location.

Method 3

If a UE is able to measure an altitude, for example, if the UE is equipped with a barometer sensor, the UE is able to estimate information on the altitude from the barometer sensor. Although the UE is able to signal information sensed by the barometer sensor to a location server as it is, the UE receives assisted information of the barometer sensor from the location server and may be then able to directly calculate an altitude value.

An MFM value can be differently measured according to an indoor altitude at which the UE is located. The UE estimates an altitude via the barometer sensor and may feedback 2D MFM information to the location server. For example, the UE can feedback altitude information, information sensed by the barometer sensor, and 2D (e.g., horizontal) MFM information to an eNB or a WiFi AP via physical layer signaling or higher layer signaling.

Subsequently, the eNB or the AP transmits the 2D MFM information received from the UE and identification information of the UE to the location server via a wired network or the like. The location server can estimate a location of the UE based on the 2D MFM information and the identification information of the UE.

In order to make the UE know a relation between a barometer sensor measurement value measured by the UE and a floor or an altitude at current time, a network can signal a relation between measurement information of the barometer sensor and an altitude, a threshold for altitude information, and the like to the UE via physical layer signaling or higher layer signaling. For example, although the UE measures atmosphere via the barometer sensor, it may be difficult to precisely identify an altitude due to weather, temperature, humidity, and the like, or a considerable error may occur. In this case, the network can signal a correction parameter for correcting a barometer sensor measurement value or a threshold of an altitude value (or, a floor of a building) corresponding to a measurement value measured by a corresponding sensor to the UE in consideration of weather, temperature, humidity, and the like of a current location. By doing so, it may be able to help the UE to identify an actual altitude via the barometer sensor. If the UE identifies altitude information via the network signaling, the UE may be able to estimate a precise location of the UE by performing feedback using 2D only or comparing the altitude information with a DB stored in the UE.

Method 4

When MFM shows a considerable difference according to one or more coordinate values among x, y, z coordinates of a UE, a location server signals location information according to an MFM value on a specific coordinate axis (or, a threshold range of an MFM value of a corresponding altitude) to the UE, an eNB, or a WiFi AP in advance to make the UE immediately know a location value on the coordinate axis when the UE measures the MFM value.

Figure 12:
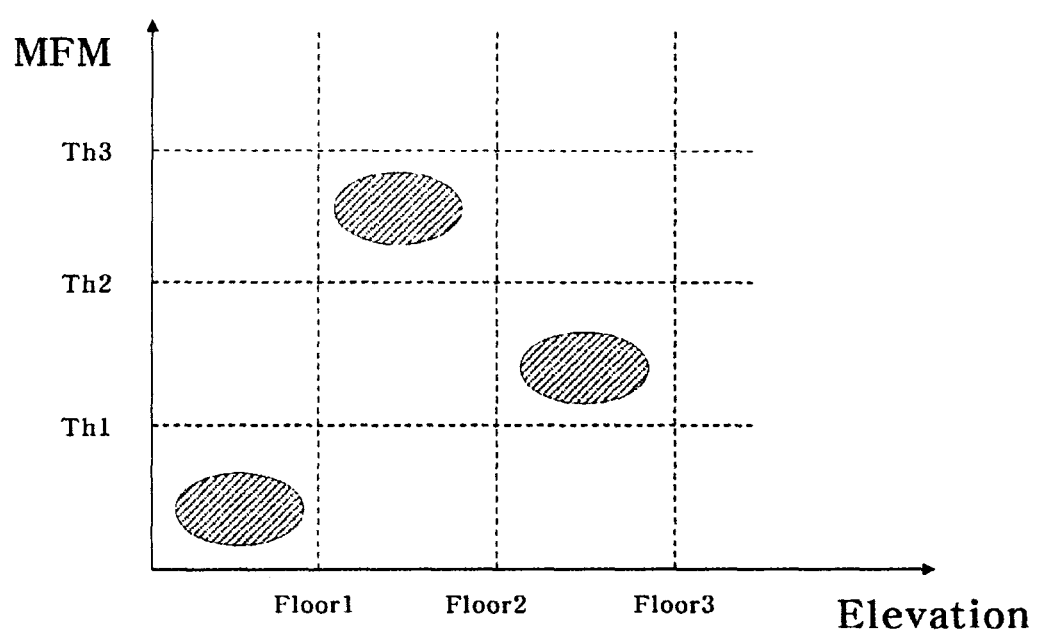
FIG. 12 is a diagram illustrating an MFM value of a data base according to one embodiment.

FIG. 12 is a diagram illustrating an MFM value of a database according to one embodiment. In FIG. 12, assume a case that an MFM value shows a considerable difference depending on a floor (altitude) at which a UE is located. For example, if the UE is located at a first floor (e.g., ceiling of the first floor at ground level), an MFM value is equal to or less than a first threshold. If the UE is located at a second floor, the MFM value is greater than a second threshold but is equal to or less than a third threshold. If the UE is located at a third floor, the MFM value is greater than the first threshold but is equal to or less than the second threshold.

A network can signal an MFM threshold according to a floor to the UE in advance via physical layer signaling or higher layer signaling. For example, the network can signal a range of the MFM values appearing at each floor to the UE via the thresholds while providing the first, the second, and the third threshold to the UE. In particular, a threshold characteristic of the MFM value according to a floor can be signaled to the UE.

Hence, if the UE measures MFM, the UE is able to immediately know a floor at which the UE is located. For example, if such a relation as 'first threshold<MFM measurement value<second threshold' is satisfied, the UE can determine that the UE is located at the third floor.

The UE can feedback a 2D MFM value of a corresponding floor and information on a floor only to the eNB, the WiFi AP, or the location server. The location server compares an MFM DB value for a floor fed back by the UE with an MFM value fed back by the UE and may be able to estimate 2D (horizontal) location information of the UE. According to the abovementioned method, if there is a limit set on the number of bits of feedback information transmitted to the network, since it is not necessary to feedback information on a specific axis, it may have an effect of enhancing resolution of a specific scalar value for the fixed number of feedback bits. As a result, it may be able to more precisely identify a 2D location.

Figure 13:
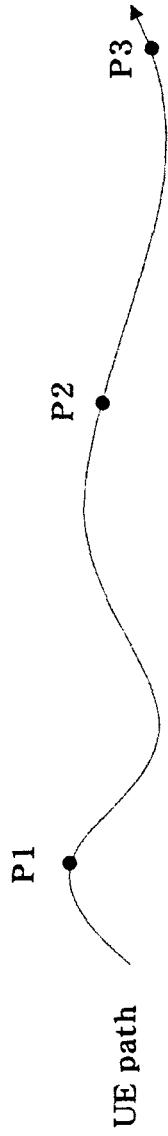
FIG. 13 is a diagram for explaining 2D MFM measurement feedback and 3D MFM measurement feedback according to one embodiment.

FIG. 13 is a diagram for explaining 2D MFM measurement feedback and 3D MFM measurement feedback according to one embodiment.

Referring to FIG. 13, a UE moves along with a trajectory connecting a P1 point, a P2 point, and a P3 point and can measure MFM at each of the points. The UE feedbacks not only MFM measurement measured at each point but also information on a relative location of each point (or, displacement information) to a network. In case of performing 2D MFM measurement feedback, the UE may omit information on a relative location of an axis. In the present embodiment, assume that feedback of information on an altitude direction (i.e., Z axis) is omitted.

Meanwhile, if it is assumed that the information on the Z axis includes N bits, 2D MFM measurement feedback may have redundancy as much as N bits compared to 3D MFM measurement feedback. In particular, if the 2D MFM measurement feedback is performed, it may simply reduce signaling overhead of the feedback information. Yet, according to one embodiment, it may also increase resolution of an MFM value according to the reduced N bits. For example, if it is assumed that the UE transmits an MFM measurement value by quantizing the MFM measurement value, in case of 2D MFM, the MFM measurement value can be transmitted via a more detailed quantization level compared to 3D MFM. In particular, when the 3D MFM is quantized, if an output bit corresponds to X bits, it may be able to configure a quantization result output bit of the 2D MFM to satisfy X+N bits.

The method 4 is partly similar to the barometer sensor information-based altitude estimation method. A difference between the two methods is in that the UE preferentially identifies an altitude via MFM based on a threshold set to the UE in advance in the present embodiment. And, since the UE feedbacks a 2D MFM value only, a feedback size can be reduced.

Method 5

Similar to the methods 3 and 4, altitude information of a UE can be obtained in advance via a small cell or a WiFi AP installed in indoor. In this case, the UE can estimate a location by transmitting altitude information of the UE and 2D MFM information to a location server.

The UE may feedback information on a WiFi AP/small cell of which reception signal strength is strongest, information on a WiFi AP/small cell on which the UE camps, or information on a WiFi AP/small cell with which the UE is associated to the location server together with an MFM value.

The aforementioned methods can be selectively applied according to capability of the UE. To this end, the UE may feedback sensor capability of the UE to an eNB or an AP in advance via physical layer signaling or higher layer signaling. The eNB or the AP can signal the values to the location server via a wired/wireless network.

Figure 14:
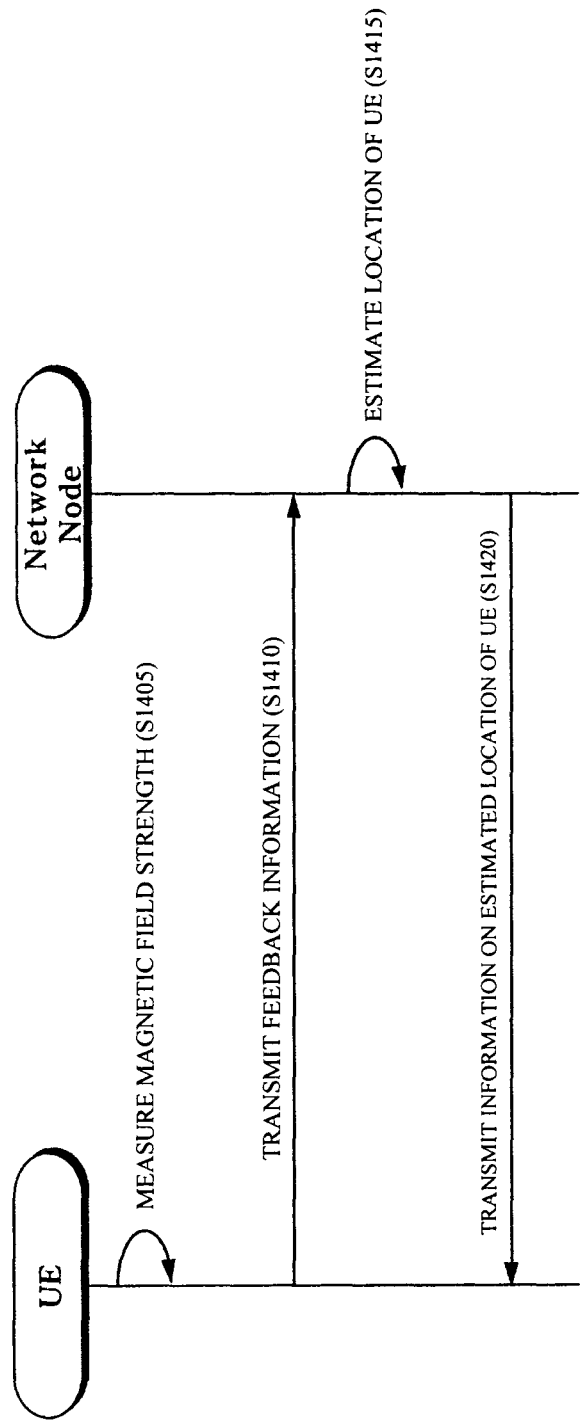
FIG. 14 is a flowchart for a method of measuring a location of a user equipment according to one embodiment of the present invention.

FIG. 14 is a flowchart for a method of measuring a location of a user equipment according to one embodiment of the present invention. Explanation on contents overlapped with the aforementioned content is omitted.

Referring to FIG. 14, a UE measures a magnetic field strength at a plurality of points on a trajectory with which the UE moves along [S1405].

The UE transmits feedback information including displacement information indicating a relative location change among a plurality of the points and information on the measured magnetic field strength to a network [S1410].

A network node estimates a location of the UE [S1415] and transmits information on the estimated location of the UE to the UE [S1420]. The location of the UE may be obtained by extracting a location where a magnetic field pattern corresponding to the feedback information appears, from magnetic field data of a three-dimensional (3D) space stored in the network.

If the UE autonomously specifies an altitude at which the UE is located, the UE can transmit feedback information in a manner of excluding displacement of horizontal direction from the displacement information. For example, if the measured magnetic field strength has a threshold characteristic that appears at a certain altitude only or the UE is equipped with a barometer sensor, the UE can autonomously specify an altitude at which the UE is located. Meanwhile, the UE can receive information on the threshold characteristic that appears at a certain altitude only or information for converting an atmosphere value sensed by the barometer sensor into an altitude value from the network in advance.

If the displacement of the horizontal direction is excluded, the UE can increase resolution of the magnetic field strength to be reported via the feedback information in consideration of a size of reduced displacement information.

The displacement information indicates a relative location of the remaining points based on a point among a plurality of points and information on magnetic field strength included in the feedback information can indicate an amount of change of magnetic field strength measured at the remaining points based on a point.

The feedback information can further include at least one RF signal measurement value selected from the group consisting of received signal strength indicator (RSSI), reference signal received power (RSRP), and reference signal time difference (RSTD) of an radio frequency (RF) signal received by the UE.

A 3D space of magnetic field data to be compared with a magnetic field pattern can be selected based on a measurement value of an RF signal.

The feedback information can be transmitted via an location position protocol (LPP).

The feedback information can further include information on an orientation where the UE measures magnetic field strength at each of a plurality of points (e.g., information obtained by a gyroscope sensor).

Figure 15:
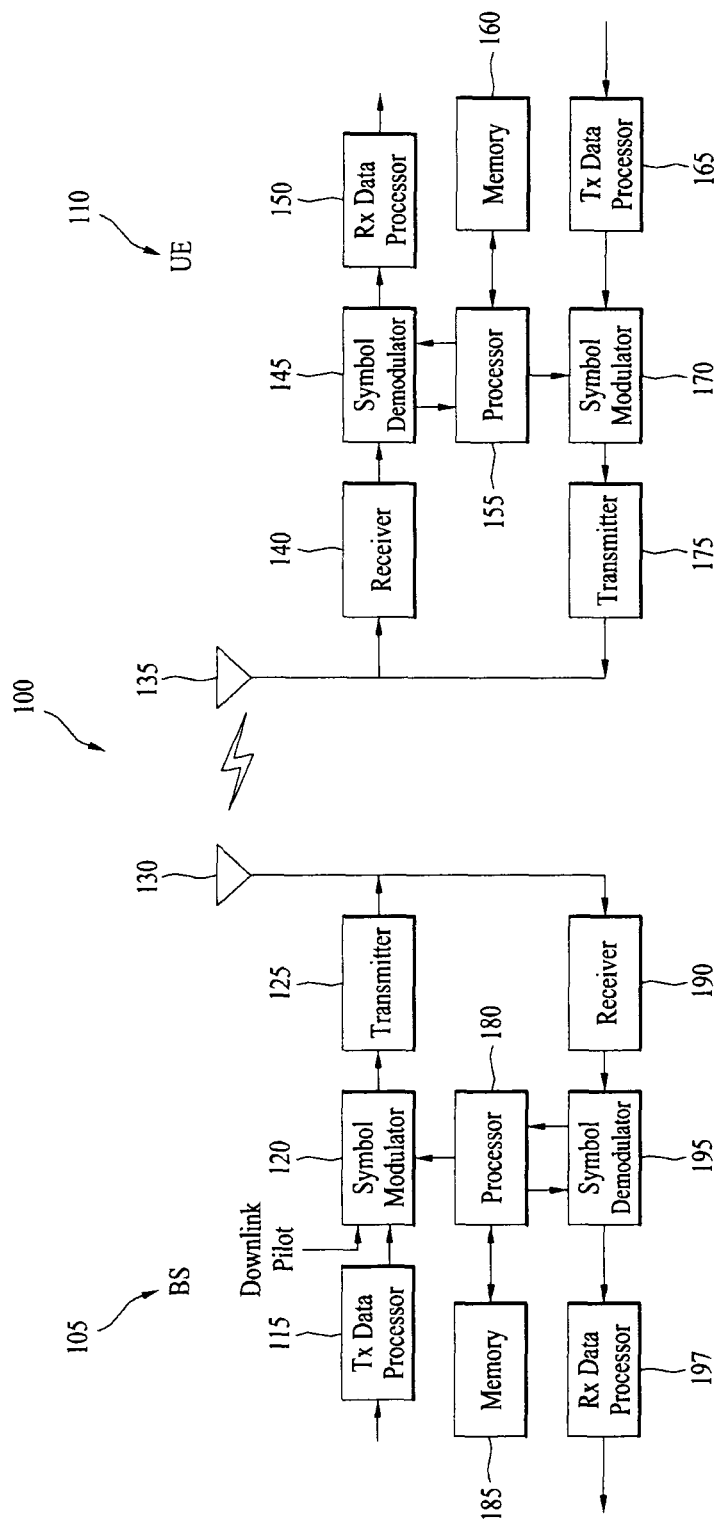
FIG. 15 is a diagram illustrating a user equipment and a base station according to one embodiment of the present invention.

FIG. 15 is a block diagram illustrating a base station (BS) 105 and a user equipment (UE) 110 for use in a wireless communication system 100 according to the present invention. The BS and the UE of FIG. 15 may perform the operations of aforementioned embodiments.

Referring to FIG. 15, the BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 receives and processes the stream of symbols to generate an uplink (UL) signal, and the UL signal is transmitted to the BS 105 through the antenna 135.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) based on the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

In the present specification, the processor 155 of the UE and the processor 180 of the base station perform operations of processing signals and data except functions for the UE 110 and the base station 105 to receive, transmit and store signals, respectively. Yet, for clarity, the processors 155 and 180 are not mentioned especially. Although the processors 155 and 180 are not mentioned especially, they can be regarded as performing a series of operations (e.g., data processing, etc.) other than the signal receiving, transmitting, and storing functions.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The embodiments of the present invention mentioned in the foregoing description are applicable to various kinds of mobile communication systems.

What is claimed is:

1. A method of measuring a location of a user equipment (UE) in a wireless communication system, the method comprising:
    measuring a magnetic field strength at a plurality of points on a trajectory with which the UE moves along;
    transmitting feedback information containing displacement information indicating a relative location change among the plurality of the points and information on the measured magnetic field strength to a network, wherein when the measured magnetic field strength has a threshold characteristic that appears at a certain altitude at which the UE is located, the UE autonomously specifies the altitude at which the UE is located, and the displacement information of the feedback information excludes displacement of a horizontal direction, and wherein based on determining that the displacement of the horizontal direction is excluded, the UE increases resolution of the magnetic field strength to be reported via the feedback information in consideration of a size of the reduced displacement information; and receiving information on the location of the UE from the network, wherein the location of the UE is obtained based on extracting a location where a magnetic field pattern corresponding to the feedback information appears, from magnetic field data of a three-dimensional (3D) space stored in the network.

2. The method of claim 1, wherein based on determining that the measured magnetic field strength has the threshold characteristic that appears at the certain altitude only or the UE is equipped with a barometer sensor, the UE autonomously specifies the altitude at which the UE is located.

3. The method of claim 2, wherein the UE receives information on the threshold characteristic that appears at the certain altitude only or information for converting an atmosphere value sensed by the barometer sensor into an altitude value from the network.

4. The method of claim 1, wherein the feedback information further comprises at least one of received signal strength indicator (RSSI), reference signal received power (RSRP), and reference signal time difference (RSTD) of a radio frequency (RF) signal received by the UE.

5. The method of claim 4, wherein the magnetic field data of the 3D space is selected based on a measurement value of the RF signal.

6. The method of claim 4, wherein the feedback information is transmitted via a location position protocol (LPP).

7. The method of claim 6, wherein the feedback information further comprises information on an orientation where the UE measures magnetic field strength at each of a plurality of the points.

8. A user equipment (UE) in a wireless communication system, the UE comprising:

a processor to measure a magnetic field strength at a plurality of points on a trajectory with which the UE moves along;

a transmitter to transmit feedback information containing displacement information indicating a relative location change among the plurality of the points and information on the measured magnetic field strength to a network, wherein when the measured magnetic field strength has a threshold characteristic that appears at a certain altitude at which the UE is located, the processor autonomously specifies the altitude at which the UE is located, and the displacement information of the feedback information excludes displacement of a horizontal direction, and wherein based on determining that the displacement of the horizontal direction is excluded, the UE increases resolution of the magnetic field strength to be reported via the feedback information in consideration of a size of the reduced displacement information; and a receiver to receive information on the location of the UE from the network, wherein the location of the UE is obtained based on extracting a location where a magnetic field pattern corresponding to the feedback information appears, from magnetic field data of a three-dimensional space stored in the network.

* * * * *